United States Patent
Lacki (10) Patent No.: US 11,938,418 B2
(45) Date of Patent: Mar. 26, 2024

(54) AUTOMATED CHROMATOGRAPHY COLUMN SWITCHING CONTROL BASED ON PRESSURE DETECTION

(71) Applicant: Cytiva Sweden AB, Uppsala (SE)

(72) Inventor: Karol Maciej Lacki, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 1114 days.

(21) Appl. No.: 15/533,591

(22) PCT Filed: Dec. 15, 2015

(86) PCT No.: PCT/EP2015/079696
§ 371 (c)(1),
(2) Date: Jun. 6, 2017

(87) PCT Pub. No.: WO2016/096790
PCT Pub. Date: Jun. 23, 2016

(65) Prior Publication Data
US 2017/0361244 A1    Dec. 21, 2017

Related U.S. Application Data (60) Provisional application No. 62/093,450, filed on Dec. 18, 2014.

(51) Int. Cl.
*B01D 15/16*    (2006.01)
*B01D 15/18*    (2006.01)
(Continued)

(52) U.S. Cl.
CPC ....... *B01D 15/163* (2013.01); *B01D 15/1807* (2013.01); *B01D 15/1871* (2013.01);
(Continued)

(58) Field of Classification Search
CPC .............. B01D 15/163; B01D 15/1807; B01D 15/1871; B01D 15/3809; G01N 30/42; G01N 30/88; G01N 2030/889
See application file for complete search history.

(56) References Cited

U.S. PATENT DOCUMENTS 5,683,491 A    11/1997    Gelsinger
6,460,420 B1 *   10/2002    Paul .......................... G01F 1/36
                                                        210/198.2
(Continued)

FOREIGN PATENT DOCUMENTS

| | | |
|---|---|---|
| JP | H11-128604 A | 5/1999 |
| WO | 2010/151214 A1 | 12/2010 |
| WO | 2012/074481 A1 | 6/2012 |

OTHER PUBLICATIONS

PCT International Search Report and Written Opinion for PCT Application No. PCT/EP2015/079696 dated Mar. 18, 2016 (8 pages).

(Continued)

*Primary Examiner* — Benjamin L Lebron
(74) *Attorney, Agent, or Firm* — Eversheds Sutherland (US) LLP (57) ABSTRACT

Certain embodiments of the invention provides a method for monitoring level of saturation of a chromatography media in a column, which method comprises measuring a first pressure at the inlet of an unloaded column; measuring a second pressure at the inlet from a loaded column; and comparing the first and second pressure measurement to determine the level of saturation of the chromatography media. Embodiments of the invention also provide related methods for controlling a chromatography system and methods for controlling a periodic counter current chromatography system, as well as a chromatography system suitable for use with the novel methods.

20 Claims, 5 Drawing Sheets

(51) Int. Cl.
*B01D 15/20* (2006.01)
*B01D 15/38* (2006.01)
*G01N 30/42* (2006.01)
*G01N 30/88* (2006.01)
*G01N 30/56* (2006.01)

(52) U.S. Cl.
CPC ......... *B01D 15/20* (2013.01); *B01D 15/3809* (2013.01); *G01N 30/42* (2013.01); *G01N 30/88* (2013.01); *G01N 30/56* (2013.01); *G01N 2030/889* (2013.01)

(56) References Cited

U.S. PATENT DOCUMENTS

| | | | | |
|---|---|---|---|---|
| 7,178,386 B1 * | 2/2007 | Gamble | ............... | G01N 30/466 |
| | | | | 210/198.2 |
| 2013/0316892 A1 * | 11/2013 | Nakamura | ............. | B01J 20/285 |
| | | | | 502/7 |
| 2014/0227766 A1 * | 8/2014 | Gagnon | ............... | B01D 15/166 |
| | | | | 435/239 |

OTHER PUBLICATIONS

Japanese Office Action for JP Application No. 2017-532669 dated Aug. 7, 2019 (10 pages with English translation).
Japanese Office Action for JP Application No. 2017-532669 dated Jul. 20, 2020 (5 pages with English translation).

* cited by examiner

AUTOMATED CHROMATOGRAPHY COLUMN SWITCHING CONTROL BASED ON PRESSURE DETECTION

CROSS REFERENCE TO RELATED APPLICATIONS

This application claims the priority benefit of PCT/EP2015/079696 filed on Dec. 15, 2015 which claims priority benefit of U.S. Provisional Patent Application No. 62/093,450 filed Dec. 18, 2014. The entire contents of which are hereby incorporated by reference herein.

FIELD OF THE INVENTION

The present invention relates to a method for determining binding capacities of a chromatography column, a chromatography system and a method for controlling a chromatography system.

BACKGROUND OF THE INVENTION

Binding capacity of a chromatography column for the solute is a very important factor in process chromatography. The binding capacity directly influences the productivity and cost of chromatography step. The binding capacity is defined either in terms of dynamic/breakthrough capacity or as the maximum binding capacity. The dynamic capacity depends on the conditions at which the solution flows through the column packed with chromatography medium, such as residence time defined as the ratio between column volume and feed flow rate. The maximum binding capacity represents a breakthrough capacity of the column if the residence time was infinitely long. The initial breakthrough capacity is defined as the amount of binding solutes taken up by a column at the point when the solutes are first detected in the effluent. The breakthrough capacity can also be defined as a capacity at a given percentage of breakthrough, where the percentage represents the amount of binding solute present in the effluent from the column expressed in percent of the solute present in the feed. According to this definition the maximum binding capacity will be equal to breakthrough capacity at 100% of breakthrough, i.e., at the point where no more solute can bind to the column. Therefore, in order to determine maximum capacity, the breakthrough capacities are measured at different levels of breakthrough, where the levels are defined by levels of concentration of solutes measured in the effluent from the column during sample loading. Often these concentrations are determined by continuously monitoring a signal in a flow through by a detector placed in the effluent line. The plot of these concentrations (signal) against time (or volume or mass loaded) is called a breakthrough curve. Location of the breakthrough on a chromatogram and its shape is related to how much solute can bind on the column and how quickly all adsorption sites are saturated with the solute. It also shows how much more solute can be bound to the column at any given time.

Breakthrough binding capacity for the solute in the presence of the impurities is one of the most critical parameters to optimize when developing a purification protocol. Because impurities more than often have similar light adsorbing properties as the solute determination of binding breakthrough capacities is a tedious and laborious work. In a typical experiment effluent from the column is collected in series of fraction, which are subsequently analyzed for the solute using high resolution techniques, such HPLC. Thus the determination of binding capacities for a chromatography column is rather complicated. In cases where the feed solution concentration is randomly varying during the feed application onto a chromatography column the true breakthrough capacities are impossible to measure. The latter is very important if one wants to operate a column at the optimum process conditions. For instance, it can be shown that under certain conditions a maximum productivity of a capture chromatography step is obtained when the solute of interest reaches a certain value of its concentration in the column effluent, for instance a 10% of its initial concentration. If the breakthrough capacity is determined according to the method described above, it is impossible to terminate loading of the column at exact 10% breakthrough if either feed concentration or process conditions, including flow rate and/or chromatography media properties, vary with time in unpredictable manner.

Furthermore, determination of breakthrough capacities at different levels of breakthrough under varying process conditions is very important in the case of continuous chromatography.

In continuous chromatography, several identical columns are connected in an arrangement that allows columns to be operated in series and/or in parallel, depending on the method requirements. Thus, all columns can be run in principle simultaneously, but slightly shifted in method steps. The procedure can be repeated, so that each column is loaded, eluted, and regenerated several times in the process. Compared to 'conventional' chromatography, wherein a single chromatography cycle is based on several consecutive steps, such as loading, wash, elution and regeneration, in continuous chromatography based on multiple identical columns all these steps occur simultaneously but on different columns each. Continuous chromatography operation results in a better utilization of chromatography resin, reduced processing time and reduced buffer requirements, all of which benefits process economy. Continuous chromatography is sometimes denoted simulated moving bed (SMB) chromatography. Simulated moving bed chromatography is an example of periodic counter current process, because periodically all the chromatography columns comprising the system are simultaneously moved in the direction opposite to the sample flow. The apparent movement of the columns is realized by appropriate redirections of inlet and outlet stream to/from the columns.

Bishop et al ("Simulated Moving Bed technology in Biopharmaceutical Processing", Bischops, M. and Pennings, M., Recovery Biological Products XI, (2003) Banff, Alberta, Canada) discloses a continuous chromatography method based on simulated moving bed (SMB) technology, which has been successfully employed for the laboratory scale purification of IgG with a protein A affinity resin. Despite the fact that the multi-column and multi-zone continuous approach provided by SMB greatly increases process efficiency, SMB systems have not been utilized to date for cGMP biopharmaceutical production at large scale, mainly because of system complexity from both hardware and operational perspectives. The operational perspective is of particular interest as the continuous methods are more complex and require many operations (steps) to occur simultaneously at very precisely predefined points in time. In contrast to batch chromatography, implementation of safety factors to account for process variability is not recommended for continuous processes as by definitions they operate on the assumption of a steady state that can only be established if there is no variability in the input to the system.

Heeter et al (Heeter, G. A. and Liapis, A. I., J. Chrom A, 711 (1995)) has suggested, as an alternative to a typical four zone SMB system, a method based on a three column periodic counter-current chromatography (3C-PCC) principle. Later, Lacki et al ("Protein A Counter-Current Chromatography for Continuous Antibody Purification", Lacki, K. M. and Bryntesson, L. M., ACS (2004) Anaheim, CA USA) described the use of such a 3C-PCC system for IgG adsorption to MabSelect™ affinity resin. This 3C-PCC method requires simpler hardware and easier operation than the typical four zone SMB system, directly reducing the cost associated with the capital equipment and the maintenance of the system.

In fact, simulated moving bed technology has been utilised for decades in various other fields. For example, U.S. Pat. No. 3,291,726 (Universal Oil Products) described as early as 1966 a continuous simulated counter-current sorption process for the petrochemical industry.

Historically, essential factors for a reliable continuous process are: 1) the quality of the columns used, and more specifically the similarity or even identity between columns, 2) constant feed composition, and 3) hardware reliance, more specifically constant flow rate delivered by pumps. If the columns are not identical, the theoretical calculations typically used to design continuous chromatography process will not be correct, and it will become difficult to design an efficient and robust continuous chromatography process. The same argument applies if feed concentration and flow rates vary with time in an unexpected manner Therefore, for scale-up considerations, having identical columns, reliable pumps in the system is essential. However, the packing of a column with a chromatography media is very complex in order to obtain repeatable results. Even small differences in the number of plates or other packing properties can have a huge effect on the end result. Furthermore, since capacities of chromatography resins typically change during resins lifetime/usage the process conditions chosen for a fresh resin will not be applicable for a resin that has been used several times. If also the feed solution concentration will vary it will be even more complicated to design an efficient continuous chromatography process that would operate at its optimum all the time.

Recently, Bangtsson P. et al. offered a method to detect a point in time when a chromatography column becomes saturated to a level that would satisfy process objectives, for instance yield or productivity (US 20120091063). In this method, detection of saturation level is based on comparison of UV signals before and after the loaded column from feed and effluent. While this solution has proven robust for many separation tasks, for cases when a product concentration is low and/or concentration of impurities is high applicability of this method can prove limited. There is a need to develop a method that can effectively monitor the level of saturation of a chromatography media, whether in a single column set up, or in a multi-column system.

BRIEF SUMMARY OF THE INVENTION

An object of the invention is to provide a reliable and dynamic method for determining and monitoring saturation level/binding capacities of a chromatography media in a column.

Thus, in one aspect, the invention provides a method for monitoring level of saturation of a chromatography media in a column, which method comprises measuring a first pressure at the inlet of an unloaded column; measuring a second pressure at the inlet from a loaded column; and comparing the first and second pressure measurement to determine the level of saturation of the chromatography media.

In certain embodiments, the level of saturation is continuously monitored during a chromatography process by measuring the second pressure continuously. In certain embodiments, the method further comprising calculating a deltapressure as the difference between the first pressure and the second pressure at two different time points during the chromatography process; and using the deltapressure to determine a saturation point (f) of the column.

In certain embodiments, the method further comprises measuring a pressure from the effluent line of the unloaded column and the loaded column, respectively; and generating a corrected pressure for the unloaded column and the loaded column, by adjusting the first pressure and the second pressure with the corresponding pressure from the effluent line; wherein the comparing step compares the corrected first and second pressures.

In certain embodiments, the method further comprises measuring a first and second pressure from each chromatography column in a periodic counter current, PCC, system and using these second pressures together with the first pressures to continuously determine the level of saturation of the different chromatography columns of the PCC system during the chromatography process.

Another object of the invention is to provide a chromatography system to achieve the method for determining and monitoring saturation level/binding capacities of a chromatography media in a column. Thus, another aspect of the invention provides a chromatography system comprising at least one chromatography column, which system further comprises: a first detector adapted to measure a first and second pressure at the feed line between the feed pump and the inlet of the at least one column, wherein the first pressure is measured for the unloaded column and the second pressure is measured for the loaded column; an optional second detector adapted to measure a pressure at the effluent line from a first column of the system; and a determining unit connected to the detectors and adapted to determine saturation level of the first column based on comparing the first and second pressures.

In certain embodiments, the determining unit of the chromatography system is adapted to continuously during the chromatography process determine saturation level of the at least one column based on pressure measured by the first and/or second detectors. In certain embodiments, the determining unit is further adapted to calculating a deltapressure as the difference between the first pressure and the second pressure at two different time points during the chromatography process; and using the deltapressure to determine a saturation point of the column. In certain embodiments, the determining unit is adapted to use the measured pressures to determine for each column a corrected first and second pressure being the first and second pressure from the feed line minus the pressure at the effluent line, respectively; and compare the corrected first and second pressures. In certain embodiments, the determining unit is further adapted to calculating a deltapressure as the difference between the corrected first pressure and the corrected second pressure at two different time points during the chromatography process; and using the deltapressure to determine a saturation point of the column, In certain embodiments, the chromatography system comprises at least two columns in a periodic counter current system and further comprising further detectors, one after each further column, each further detector being adapted to measure a further pressure at the effluent line from each further column, each detector being connected to the determining unit, the determining unit being adapted to continuously during the chromatography process determine saturation level of each chromatography column based on the pressure measured by the first, second and further detectors.

In certain embodiments, the chromatography system further comprising a control unit connected to the determining unit and adapted to continuously monitor the determined saturation level during the chromatography process and in real time control the start and stop of different chromatography process steps in dependence of the determined saturation level.

In one embodiment of the invention the chromatography system is a periodic counter current system.

A further object of the invention is to provide a reliable and dynamic method for controlling a chromatography system. Thus, in one aspect, the invention provides a method for controlling a chromatography system comprising at least one column, comprising the steps of: determining saturation level of the at least one chromatography column according to certain aspects of the invention; and controlling the start and stop of the different chromatography process steps according to the determined saturation level. In certain embodiments, the method is characterised by continuously determining the saturation level during the chromatography process and in real time controlling the start and stop of the different chromatography process steps according to the determined saturation level.

A further object of the invention is to provide a reliable and dynamic method for controlling a periodic counter current chromatography system. Thus, in one aspect, the invention provides a method for controlling a periodic counter current chromatography system comprising at least two columns, comprising the steps of: measuring a first pressure representative of the unloaded column from each column in the system; measuring a second pressures representative of the loaded column from each column in the system; determining the saturation level of each chromatography column according to certain embodiments of the invention; and controlling the feed to and between the columns in dependence of the determined saturation level.

In certain embodiments, the method for controlling a periodic counter current chromatography system is characterised by continuously determining the saturation level during the chromatography process and in real time controlling the feed to and between the columns in dependence of the determined saturation level.

In certain embodiments, the method for controlling a periodic counter current chromatography system further comprises controlling the flow rates for the feed and buffer pumps in dependence of the determined saturation level.

In certain embodiments, the method for controlling a periodic counter current chromatography system further comprises compensating for any differences in the different column properties and/or flow rates by adjusting for how long, and in which position, different columns should be in the loading zone according to the determined saturation level.

BRIEF DESCRIPTION OF THE DRAWINGS

FIG. 4 a, b, and c shows schematically three valves of FIG. 3.

DETAILED DESCRIPTION OF THE INVENTION

To circumvent the difficulties discussed in relation to prior art a real time control algorithm based on feedback like control principle is provided by the present invention. Accordingly, methods for assessing state of different columns at any given moment of the process are of particular interest. For instance, knowing of a binding capacity of a chromatography column at a particular level of breakthrough would allow one to assess if the column can still bind solutes and how much solute still can be bound before the column reaches full saturation. Similarly, it is of paramount interest from the process yield perspective to know if the initial breakthrough capacity has been reached, as at this point the solute will be found in the effluent stream from the column and, if no proper action is taken, would be directed to waste or would be collected together with other non-binding components.

Thus, an embodiment of the invention provided a methodology for detection of column saturation level or breakthrough based on monitoring of pressure drop over a column being saturated and using this information to detect a desired point of breakthrough. This may be achieved by (1) detecting explicit value of pressure drop, or (2) detecting rate of change of pressure drop as a function of time and or applied volume, or mass. Another embodiment of the invention provides a simpler method for the detection of column saturation level or breakthrough. Thus, the detection may be based on comparing the pressure from an unloaded column to that of a loaded column. By "unloaded column", it is meant that the same column that has not been loaded with a sample to be separated, or just prior to any breakthrough of either the target compound or impurities. Alternatively, an "unloaded column" may be an identical column that is packed with the same kind of resin as the separation column, and equilibrated with the same column equilibration buffer.

Figure 1:
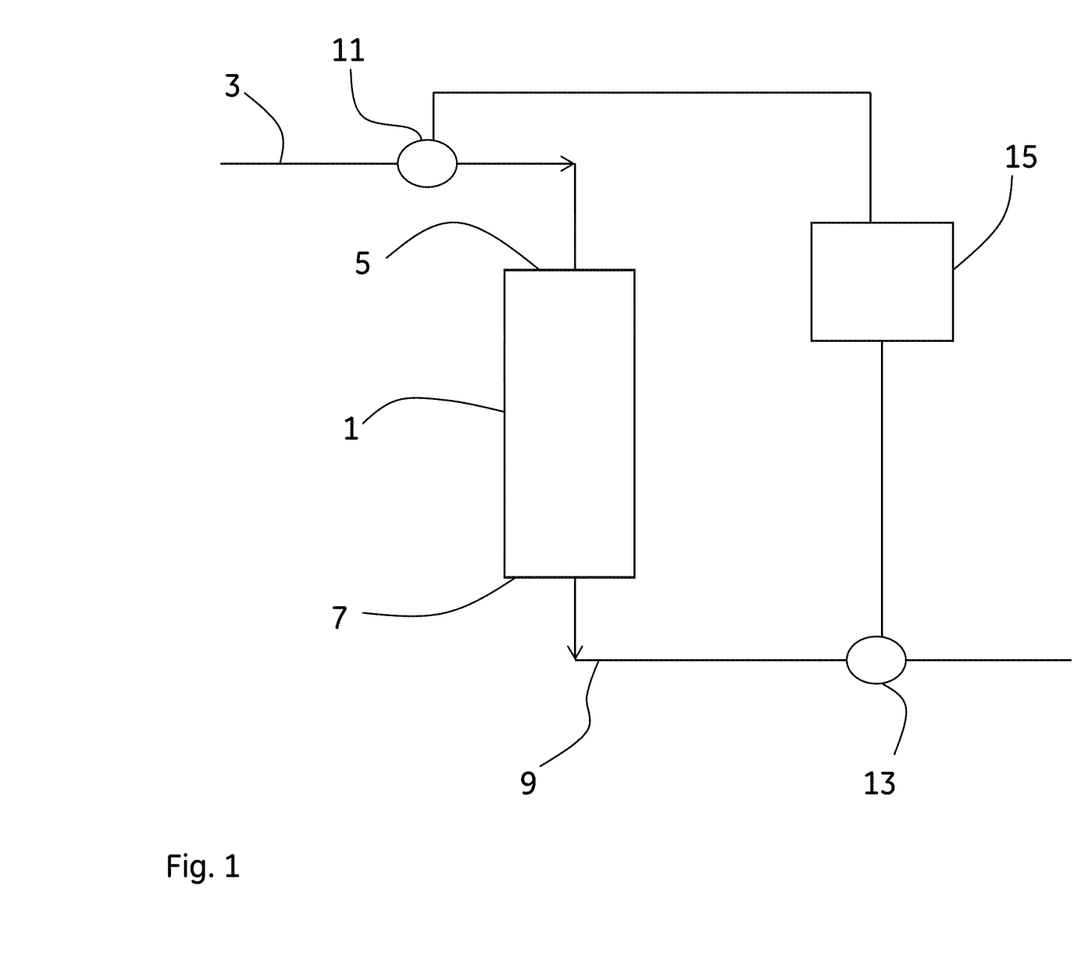
FIG. 1 shows schematically a chromatography system comprising one chromatography column and two detectors according to the invention.

FIG. 1 shows schematically a part of a simple chromatography system according to an embodiment of the invention. This chromatography system comprises one chromatography column 1. It further comprises a feed line 3 connected to an inlet end 5 of the chromatography column 1. The sample to be passed through the column 1 can be added through the feed line 3. The system further comprises an effluent line 9 connected to the opposite end, i.e. the outlet end 7 of the chromatography column 1. The sample having passed the chromatography column 1 can pass through the effluent line 9. The chromatography system comprises a first detector 11 positioned somewhere along the feed line 3 preferably close to inlet end 5 of the column 1. The first detector 11 is adapted to detect a signal in the feed line. Furthermore the chromatography system comprises a second detector 13 positioned somewhere along the effluent line 9, preferably close to the outlet end 7 of the column 1 and adapted to detect an effluent signal. The first and the second detectors 11, 13 are suitably the same type of detectors. In certain embodiments the first and the second detectors are pressure sensors, i.e. measuring the pressure of the sample.

Pressure sensors are well known and may alternatively be called pressure transducers, pressure transmitters, pressure senders, pressure indicators, piezometers and manometers, among other names. Other possible types of detectors are measuring UV, pH, conductivity, light scattering, fluorescence, IR or visible light. If the different detectors in the system are not the same type of detectors the detected signals need to be correlated when used for the further calculations according to the invention.

Furthermore, according to the invention, the first and/or second detectors 11, 13 are connected to a determining unit 15. This unit analyzes the signals detected in the first and second detectors 11, 13 in order to determine binding capacities of the chromatography column.

In another embodiment of the invention, in contrast to the chromatography system illustrated in FIG. 1, the chromatography system comprises a single detector positioned somewhere along the feed line preferably close to inlet end of the column. This detector is adapted to detect a pressure signal in the feed line during a chromatography process, whether when the column is unloaded, or when the column is loaded. In certain embodiments the detector is a pressure sensor. Furthermore, the detector is connected to a determining unit which analyzes the signals detected in the detector in order to determine binding capacities and/or saturation level of the chromatography column.

In another embodiment of the invention, in contrast to the alternative chromatography systems illustrated in FIG. 1 and above, a chromatography system may further comprise another detector positioned somewhere along the feed line of the column. The detector is adapted to detect a different signal than pressure in the feed line. Furthermore the chromatography system comprises another detector positioned somewhere along the effluent line, and adapted to detect an effluent signal other than pressure. These detectors may suitably be the same type of detectors. In certain embodiments the detectors measure UV, pH, conductivity, light scattering, fluorescence, IR or visible light. Furthermore, these detectors are also connected to a determining unit. This unit analyzes the signals detected, and uses these signals with the pressure signals in assessing the binding capacities and or saturation level of the chromatography column.

Figure 2:
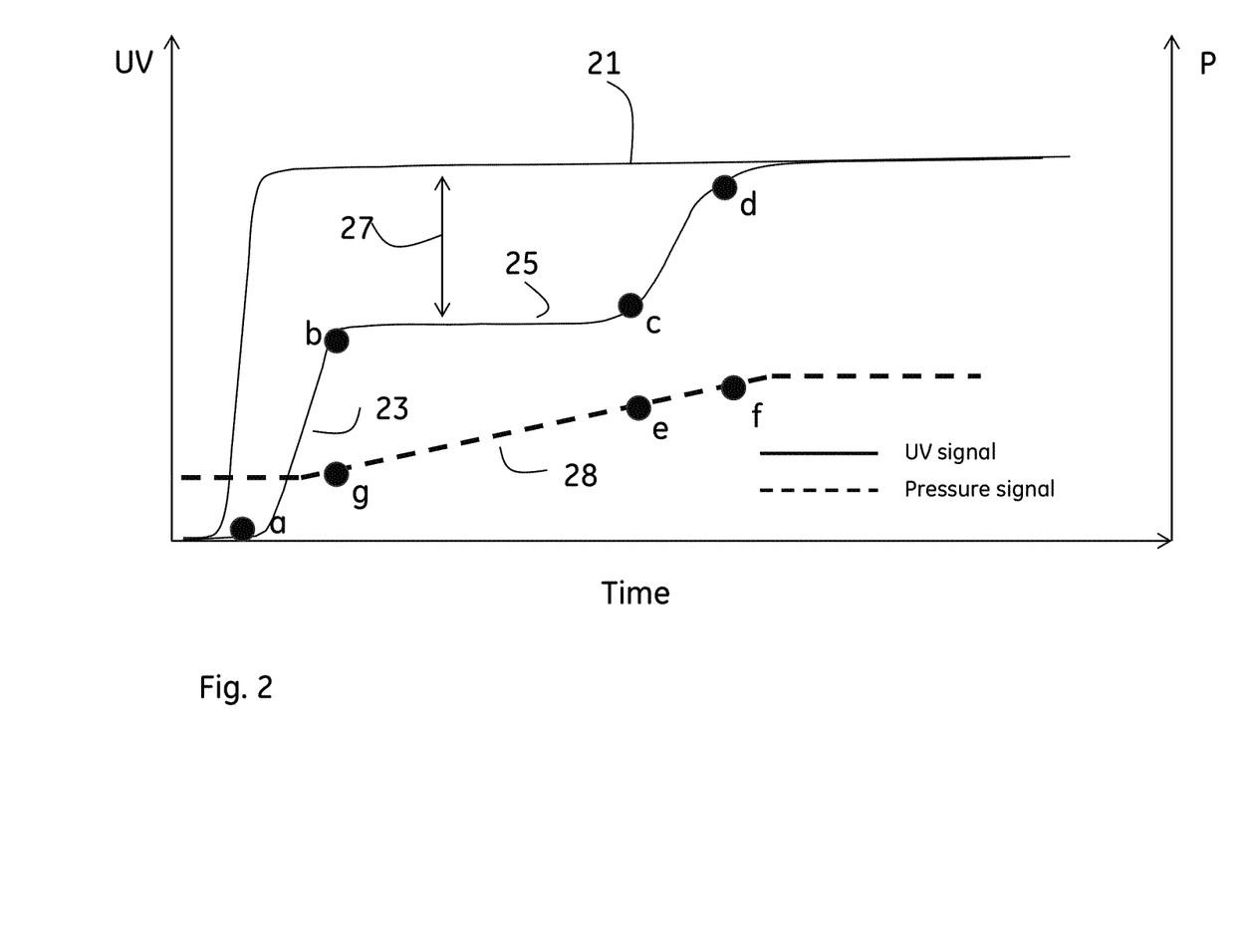
FIG. 2 is a diagram comparing UV signals vs pressure signals obtained from detectors according to a chromatography system design of FIG. 1.

To demonstrate certain embodiments of the invention, pressure signals detected are shown and compared to UV signals, in FIG. 2, in a diagram showing signal strength over time. FIG. 2 shows curves representing: the pre-column UV signal (21, feed signal), the post column UV signal (25, effluent signal), and the pressure signal measured on the feed line (28).

Curves 21 and 25 are used to determine UV value (27) representing the total concentration of product in the feed. By following the change in difference between 21 and 25 one can monitor concentration of the product in effluent stream from the column and use it to calculate level of the column saturation with the product (US 20120091063). The feed signal 21 is essentially a straight line since the feed sample is in this case and during this time window constant in composition. The effluent signal 23 will start rise from zero at point a, as soon as some of the sample has passed the column 1 and entered the passage of the effluent line 9 where the second detector 13 is positioned. The signal will then rise until point b, where it levels out into a plateau 25. This plateau 25 arises when all the non binding components in the feed have passed the column. A breakthrough point c is further defined after the plateau 25 when the signal 23 starts to rise again. This is due to the fact that the chromatography media in the column 1 starts to get saturated and some of the parts of the sample that should have been bound in the column start to break through the column. A breakthrough point d is further defined as the signal 23 approaches the signal 21. This point is defined as a saturation point and represents the moment when chromatography media is almost fully saturated with the binding components of the sample.

Curve 28 represents changes in pressure measured on the feed line during feed application on the column. A steady increase in pressure during the load phase enables correlating the pressure, measured over the column and/or in the feed line, with the column saturation with the product. The pressure curve (28) can be also used to detect various levels of breakthrough of the product from the column, e.g., levels represented by points e and f, as otherwise measured using deltaUV method (points c and d,) in US 20120091063. In one embodiment, the correlation between pressure curve and the breakthrough part of the UV curve (25) can be established if the UV curve is known. In another embodiment, changes in pressure (curve 28) is correlated with the column saturation level by performing an experiment in which the column is being loaded with different amount of product, pressure is being measured and concentration of the product is determined in fraction collected from the effluent from the column. The measured pressure for a chromatography system may change depending on for example the porosity of the resin, particle size of the resin, viscosity of the feed, length and width of the column.

According to the invention at any given point in time a Deltasignal may be calculated which is defined to be the signal difference between a signal at for instance point (e) or (f) measured at the given time minus the signal (g) measured at a previous time. A Deltasignalmax may be calculated which is defined to be the signal measured at full column saturation minus the signal measured at the beginning of the sample application (point g). This Deltasignal can then be used for defining suitable levels for the breakthrough point and the saturation point for example. The breakthrough point can suitably be defined to be a certain predefined percentage of the Deltasignalmax, for example somewhere in the span of 1-10% or more suitably in the span of 1-3% and the Saturation point can suitably be defined to be a certain predefined percentage of the Deltasignalmax, for example somewhere in the span of 60-90% or more suitable in the span of 70-80%. In other embodiment, the breakthrough point can suitably be defined to be a certain predefined level of Deltasignal.

One advantage with this approach of determining the breakthrough point and the saturation point is that this could be done automatically in real time and it is independent of the feed concentration.

In a further aspect of the invention these determinations of binding capacities, for example breakthrough and saturation points, are used for automatically controlling the start and stop of the different chromatography process steps, i.e. when a certain breakthrough or saturation point level has been reached a control system can control the chromatography system to proceed to the next process step such as redirecting column effluent to a different collection point, or to stop loading step and initiate column wash step.

Figure 3:
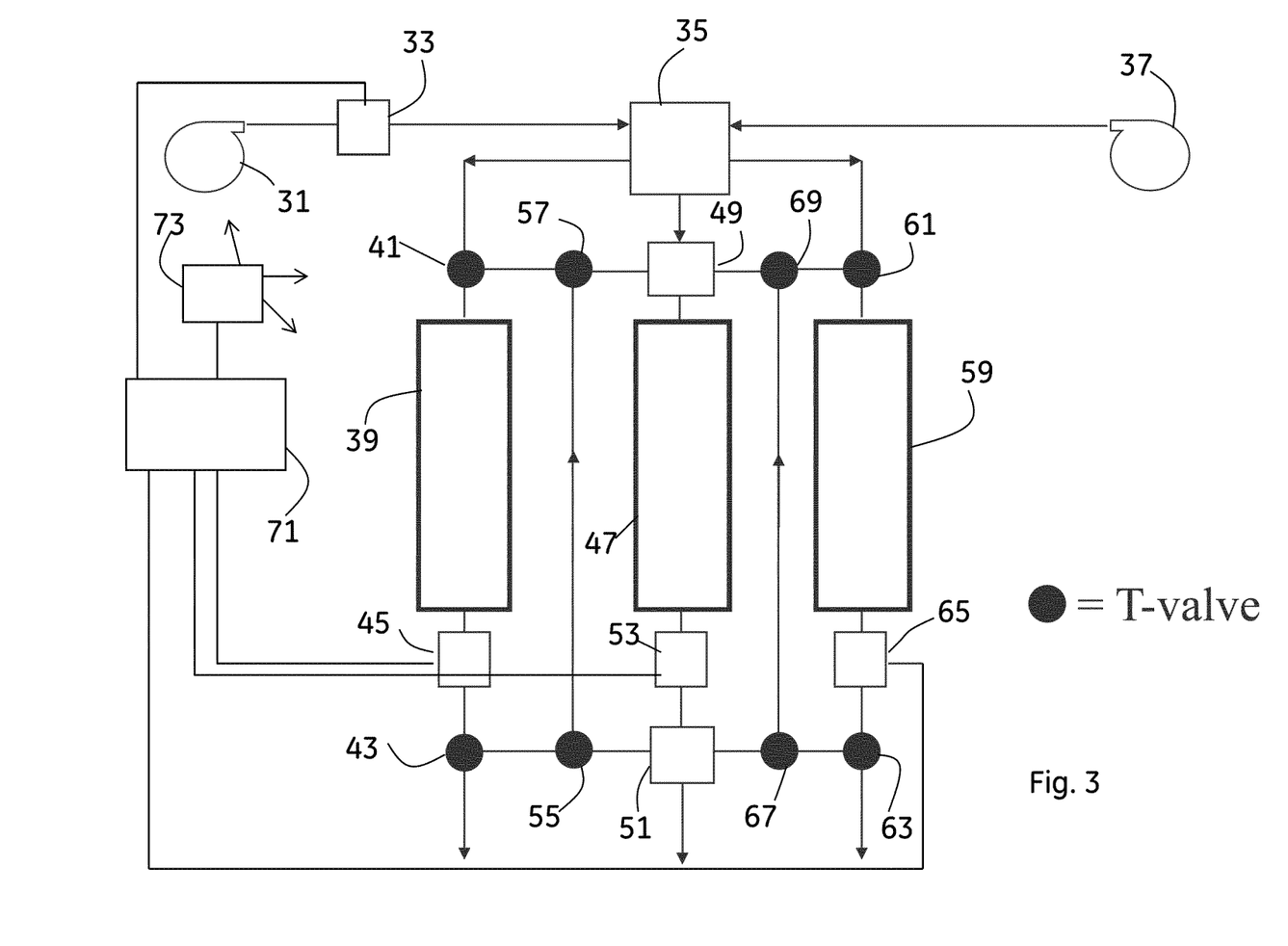
FIG. 3 shows schematically a three column periodic counter current (3C-PCC) system comprising four detectors according to the invention.

In another aspect of the invention the chromatography system comprises more than one chromatography columns, in a so called periodic counter current (PCC) system. In the periodic counter current system, most of the time the feed is passed through at least two columns connected in series. The series is often called a loading zone and addition and removal of columns in/from the loading zone is based on predetermined breakthrough and saturation points for the last and the first column in series, respectively. In FIG. 3 such a system according to the invention comprising three columns is shown schematically. The benefits of the invention are even more explicit in this example because one common problem in PCC systems is that in order to be able to get an efficient system operation the columns used in the system need to be as identical as possible and the feed composition and flow rates should be constant, or at least their changes with process time should be known a priori. With the invention any differences in columns binding capacities and/or flow rates can be compensated for by adjusting for how long, and in which position, the different columns should be in the loading zone according to the determined breakthrough and saturation points.

In FIG. 3 a feed pump 31 is shown connected via a first detector 33 to a first valve block 35. A buffer pump 37 is also connected to this first valve block 35. The first valve block 35 is further connected to the inlet of a first column 39 via a first T-valve 41. An outlet end of the first column 39 is connected to a second T-valve 43 through a second detector 45. The first valve block 35 is further connected to the inlet of a second column 47 via a second valve block 49. An outlet end of the second column 47 is connected to a third valve block 51 via a third detector 53. Furthermore, a third T-valve 55 is connected between the second T-valve 43 and the third valve block 51. The third T-valve 55 is also connected to a fourth T-valve 57 which is also connected to the first T-valve 41 and the second valve block 49. Hereby the effluent from the first column 39 can be directed to the inlet of the second column 47 through T-valves 43, 55, 57 and block valve 49.

Figure 4A:
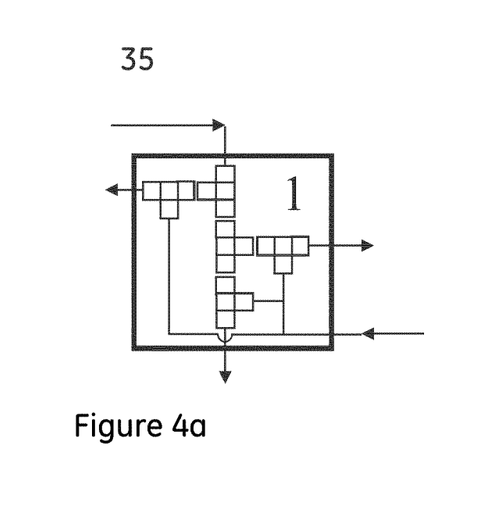
Figure 4B:
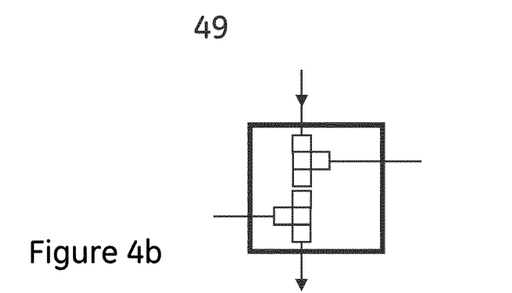
Figure 4C:
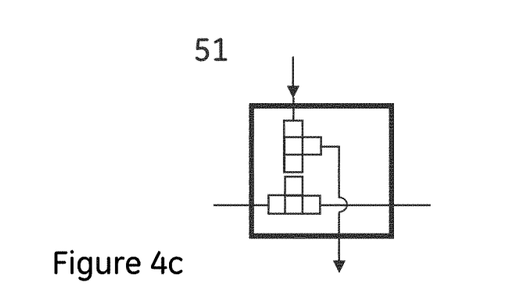

Furthermore the first valve block 35 is connected to the inlet of a third column 59 via a fifth T-valve 61. An outlet end of the third column 59 is connected to a sixth T-valve 63 via a fourth detector 65. Furthermore a seventh T-valve 67 is connected between the third valve block 51 and the sixth T-valve 63. The seventh T-valve 67 is also connected to an eighth T-valve 69 which is also connected to the second valve block 49 and the fifth T-valve 61. Hereby the effluent from the second column 47 can be directed to the inlet of the third column 59. The effluent from the third column 59 can be directed to the inlet of the first column 39 through valves 63, 67, 51 55, 57 and 41. The construction of the first valve block 35 is schematically shown in FIG. 4a, the construction of the second valve block 49 is schematically shown in FIG. 4b and the constructions of the third valve block 51 is schematically shown in FIG. 4c. In these Figures each group of four boxes represent a T-valve (3 way valve). Furthermore, according to the invention the first, second, third and fourth detectors 33, 45, 53, 65 are all connected to a determining unit 71. The determining unit is adapted to use the detected signals from the detectors to determine breakthrough and saturation points for the three different columns. The determining unit 71 and all the valve blocks and T-valves and pumps are further connected to a control unit 73 (all the connections are not shown in the Figure) which is adapted to control the chromatography system in terms of when to remove or add columns from/into the loading zone, change flow rates, start new wash steps, etc. The detectors 33, 45, 53, 65 are in one embodiment pressure sensors/. Other examples of detectors that can be used for this invention have previously been discussed.

In one embodiment of the invention the chromatography process carried out in the system of FIG. 3 comprises:
(a) Continuously monitoring a signal in the feed line with the first detector 33 and in effluent from each of the columns 39, 47, 59 (with the second, third and fourth detectors 45, 53, 65) and calculating a corrected signal for each column 39, 47, 59;
(b) passing feed comprising at least one target compound across a $1^{st}$ adsorbent (chromatography media in the first column 39), and directing the outflow from the $1^{st}$ adsorbent to a $2^{nd}$ adsorbent (chromatography media in the second column 47) when the corrected signal (definition as described above in relation to FIG. 2) measured for the $1^{st}$ adsorbent reaches a predetermined value x1;
(c) redirecting the feed to the $2^{nd}$ adsorbent, and passing wash liquid across the $1^{st}$ adsorbent to which target compound has bound when the corrected signal obtained for a $1^{st}$ adsorbent reaches a predetermined value x2;
(d) directing the wash liquid outflow to the $3^{rd}$ adsorbent (chromatography media in the third column 59) and subsequently directing the outflow from the $2^{nd}$ adsorbent to the $3^{rd}$ adsorbent when the corrected signal obtained for a $2^{nd}$ adsorbent reaches a predetermined value x1;
(e) regenerating the $1^{st}$ adsorbent;
(f) redirecting the feed to the $3^{rd}$ adsorbent, and passing wash liquid across the $2^{nd}$ adsorbent to which target compound has bound when the corrected signal obtained for a $2^{nd}$ adsorbent reaches a predetermined value x2;
(g) directing the wash liquid outflow to the $1^{st}$ adsorbent, and subsequently directing the outflow from the $3^{rd}$ adsorbent to the $1^{st}$ adsorbent when the corrected signal obtained for a $3^{rd}$ adsorbent reaches a predetermined value x1;
(h) regenerating the $2^{nd}$ adsorbent;
(i) redirecting the feed to the $1^{st}$ adsorbent, and passing wash liquid across the $3^{rd}$ adsorbent to which target compound has bound when the corrected signal obtained for a $3^{rd}$ adsorbent reaches a predetermined value x2;
(j) directing the wash liquid outflow to the $2^{nd}$ adsorbent, and subsequently directing the outflow from the $1^{st}$ adsorbent to the $2^{nd}$ adsorbent when the corrected signal obtained for a $1^{st}$ adsorbent reaches a predetermined value x1;
(k) regenerating the $3^{rd}$ adsorbent;
(l) repeating steps (b)-(k);
wherein at least one target compound is collected in step (d), (g) and/or (j). Predetermined values of x1 and x2 represent breakthrough and saturation points, respectively.

The current invention enables use of not identical columns when operating a counter current system because any differences in the columns properties can be compensated for by automatically adjusting breakthrough and saturation switching points based on the Deltasignal and Deltsignalmax measured for each of the columns It also enables operating a counter current system when unexpected changes in feed concentration occur as any change in the feed concentration, and thus a change in the mass loaded into each column can be compensated for by automatically adjusting the breakthrough and saturation switching points based on Deltasignal that automatically compensates for variation in amount of target loaded on the column.

In another embodiment of the invention, the chromatography system comprising of more than 2 chromatography columns can be used for direct capture of a product from a feed stream originated from a perfusion cell culture. For a person skilled in art, it is well known that concentrations of components in such stream will vary with time, and without an automated control algorithm operation of the chromatography system would be impossible without a risk of significant losses of product due to wrongly a priori assigned redirection points.

EXAMPLE

The present example is provided for illustrative purposes only, and should not be construed as limiting the present invention as defined by the appended claims.

This example illustrates a continuous primary capture step for purification of a monoclonal antibody (MAb) from a mixture containing MAb and host cell proteins, on protein A chromatography resin using a three column periodic counter current (3C-PCC) system according to the invention (i.e. in this example the detectors are UV detectors or pressure sensors). More specifically, three similar columns were packed with the Protein A chromatography resin MabSelect™ SuRe LX (GE Healthcare Bio-Sciences, Uppsala, Sweden). The columns were connected to an ÄKTA™ PCC (GE Healthcare Bio-Sciences, Uppsala, Sweden) chromatography system that was configured into a three column periodic counter current system, 3C-PCC with an automated control function based on continuous comparison of UV or pressure signals measured before and after each of the three columns. Absorbance from each detector were recorded using UNICORN™ software (GE Healthcare Bio-Sciences, Uppsala, Sweden). UNICORN™ is also used for control of all pumps and valves. Elute from the protein A columns MAb was collected in a single pool.

The following single column chromatography cycle was used as a base for operating the three column ÄKTAPCC system in a continuous manner: 1) column equilibration with 5 column volume (CV) of buffer A; 2) column loading with feed; 3) column wash with 5 CV of buffer A; 4) column wash with 1 CV of buffer B; 5) column elution with 4 CV of buffer C; 6) column strip with 2 CV of buffer D; 7) column CIP with 3 CV of buffer E. All steps were performed at 0.94 mL/min flow rate.

Composition of solutions used is given below:
Buffer A: PBS buffer, pH 7.4
Buffer B: 50 mM acetate buffer pH 6
Buffer C: 50 mM acetate buffer pH 3.5
Buffer D: 100 mM acetate pH 2.9
Buffer E: 100 mM NaOH
Feed: ~2.00 g/L MAb in a clarified cell culture fluid contain host cell proteins Few hundred milliliters of solution containing the feed were continuously fed into the experimental 3C-PCC setup described above. The absorbance and pressure of the feed solution was measured continuously by the first detector positioned on the feed line. The purified MAb was eluted from the system in a discrete manner by applying the buffer B into the saturated column. The saturated column was washed prior to the elution step.

Figure 5:
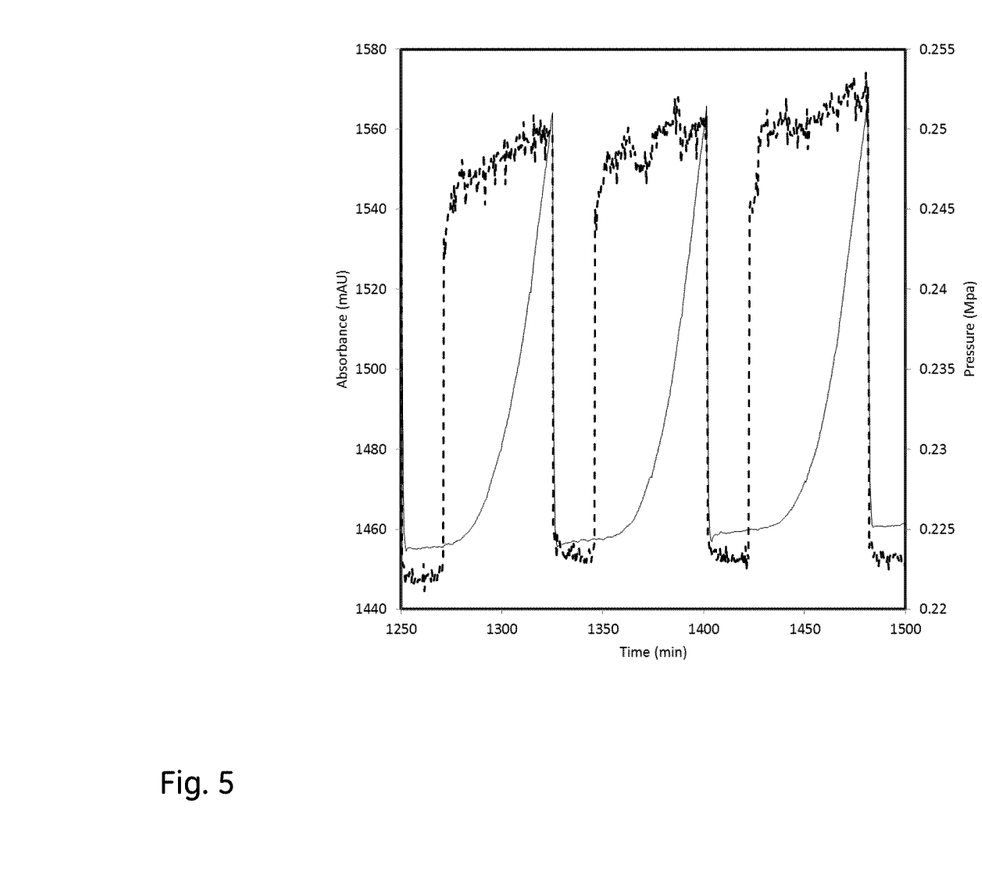
FIG. 5 is a diagram comparing UV signals vs pressure signals obtained from three detectors in a 3C-PCC system. Solid line: UV signal; dotted line: pressure signal.

FIG. 5 shows partial data obtained during continuous capture of monoclonal antibody on Protein A columns using three column periodic counter current system. Corresponding changes in pressure with changes in UV signal as measured for three different load cycles are well documented. The initial pressure increase and the pressure decrease at the end of each cycle are due to system configurations effects related to opening and closing of respective flowpaths during PCC operation.

While the particular embodiment of the present invention has been shown and described, it will be obvious to those skilled in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A method for monitoring level of saturation of a chromatography media in a column, which method comprises
providing an unloaded column;
measuring a first pressure at the inlet of the unloaded column;
loading a sample into the unloaded column to form a loaded column;
measuring a second pressure at the inlet from the loaded column;
comparing the first and second pressure measurement to determine the level of saturation of the chromatography media; and
stopping the loading of the sample and initiating a column wash step if the level of saturation has reached a saturation point level, wherein the level of saturation is continuously monitored during a chromatography process by measuring the second pressure continuously.

2. The method according to claim 1, further comprising measuring a pressure from the effluent line of the unloaded column and the loaded column, respectively; and
generating a corrected pressure for the unloaded column and the loaded column, by adjusting the first pressure and the second pressure with the corresponding pressure from the effluent line;
wherein the comparing step compares the corrected first and second pressures.

3. The method according to claim 1, further comprising calculating a deltapressure as the difference between the first pressure and the second pressure at two different time points during the chromatography process; and using the deltapressure to determine a saturation point (f) of the column.

4. The method according to claim 1, further comprising measuring a first and second pressures from each chromatography column in a periodic counter current, PCC, system and using these second pressures together with the first pressures to continuously determine the level of saturation of the different chromatography columns of the PCC system during the chromatography process.

5. The method according to claim 1, wherein the first and second pressure are measured using a detector of the same type.

6. The method according to claim 5, wherein the first and second pressure are measured using a pressure sensor.

7. A method for controlling a chromatography system comprising at least one column, comprising the steps of:
determining a saturation level of the at least one chromatography column, wherein the determining of the saturation level comprises (i) providing the at least one chromatography column in an unloaded state, and measuring a first pressure at the inlet of the at least one unloaded chromatography column, (ii) loading a sample in the at least one unloaded chromatography column to produce at least one loaded chromatography column, and measuring a second pressure at the inlet from the at least one loaded chromatography column, and (iii) comparing the first and second pressure measurement to determine the saturation level; and stopping the loading of the sample and initiating a column wash step if the level of saturation has reached a saturation point level, wherein the level of saturation is continuously monitored during a chromatography process by measuring the second pressure continuously.

8. The method according to claim 7, characterised by controlling, in real time, the start and stop of the loading steps according to the determined saturation level.

9. A method for controlling a periodic counter current chromatography system comprising at least two columns, comprising the steps of:
measuring a first pressure representative of the unloaded column from each column in the system;
measuring a second pressure representative of the loaded column from each column in the system;
determining the saturation level of each chromatography column according to claim 5; and
determining whether the level of saturation has reached a saturation point level, and, if the saturation point level is reached, modifying a flow rate of (i) a buffer pump or (ii) the feed to and between the columns in dependence of the determined saturation level, wherein the level of saturation is continuously monitored during a chromatography process by measuring the second pressure continuously.

10. The method according to claim 9, characterised by controlling, in real time, the flow rate of the feed to and between the columns in dependence of the determined saturation level.

11. The method according to claim 9, comprising compensating for any differences in the columns and/or flow rates by adjusting for how long, and in which position, different columns should be in a loading zone according to the determined saturation level.

12. A chromatography system comprising at least one chromatography column, further comprising:
a first detector adapted to measure a first and second pressure at the feed line between the feed pump and the inlet of the at least one column, wherein the first pressure is measured for the unloaded column and the second pressure is measured for the loaded column;
an optional second detector adapted to measure a pressure at an effluent line from a first column of the system; and
a determining unit connected to said detectors and adapted to determine saturation level of the first column based on comparing said first and second pressures.

13. The chromatography system according to claim 12, wherein said determining unit is adapted to continuously during the chromatography process determine saturation level of said at least one column based on pressure measured by the first and/or second detectors.

14. The chromatography system according to 8, comprising at least two columns in a periodic counter current system and further comprising further detectors, one after each further column, each further detector being adapted to measure a further pressure at the effluent line from each further column, each detector being connected to the determining unit, said determining unit being adapted to continuously during the chromatography process determine saturation level of each chromatography column based on the pressure measured by the first, second and further detectors.

15. The chromatography system according to claim 12, wherein all the detectors are of the same type.

16. The chromatography system according to claim 15, wherein said detectors are pressure sensors.

17. The chromatography system according to claim 13, wherein said determining unit is adapted to use the measured pressures to determine for each column a corrected first and second pressure being the first and second pressure from the feed line minus the pressure at the effluent line, respectively; and compare the corrected first and second pressures.

18. The chromatography system according to claim 17, wherein said determining unit is further adapted to calculating a deltapressure as the difference between the corrected first pressure and the corrected second pressure at two different time points during the chromatography process; and using the deltapressure to determine a saturation point (f) of the column.

19. The chromatography system according to claim 12, further comprising a control unit connected to the determining unit and adapted to continuously monitor said determined saturation level during the chromatography process and in real time control the start and stop of different chromatography process steps in dependence of said determined saturation level.

20. The chromatography system according to claim 13, wherein said determining unit is further adapted to calculating a deltapressure as the difference between the first pressure and the second pressure at two different time points during the chromatography process; and using the deltapressure to determine a saturation point (f) of the column.

* * * * *